US006312493B1

(12) United States Patent
Eltink et al.

(10) Patent No.: US 6,312,493 B1
(45) Date of Patent: Nov. 6, 2001

(54) WATER SOLUBLE FERTILIZER COMPOSITIONS

(75) Inventors: Michael Gustaaf Eltink, Heerlen; Philip van Roij; Edze Jan Tijsma, both of Maastricht; Johannes Gijsbertus Antonius Terlingen, Landgraaf; Hendrikus Gijsbertus Adrianus van Kaathoven, Nieuwstadt, all of (NL)

(73) Assignee: OMS Investments, Inc., Wilmington, DE (US)

( * ) Notice: Subject to any disclaimer, the term of this patent is extended or adjusted under 35 U.S.C. 154(b) by 0 days.

(21) Appl. No.: 09/414,214

(22) Filed: Oct. 7, 1999

(51) Int. Cl.[7] .............................. C05B 7/00; C05C 5/00; C05C 9/00; C05D 9/00; C05D 9/02
(52) U.S. Cl. .................. 71/28; 71/27; 71/29; 71/30; 71/31; 71/33; 71/34; 71/58; 71/59; 71/60; 71/63; 71/64.1; 71/35; 71/48; 71/49; 71/50; 71/53
(58) Field of Search .................. 71/27, 28, 29, 71/30, 31, 33, 34, 58, 59, 60, 63, 64.1, 35, 48, 49, 50, 53

(56) References Cited

U.S. PATENT DOCUMENTS

| 4,328,025 | * | 5/1982 | Whitcomb | 71/27 |
| 5,174,806 | | 12/1992 | Masuda . | |
| 5,372,626 | * | 12/1994 | Zivion et al. | 71/27 |
| 5,772,723 | * | 6/1998 | Robinett et al. | 71/27 |
| 5,830,255 | | 11/1998 | Lovatt . | |

FOREIGN PATENT DOCUMENTS

PCT/US92/ 00850  1/1992 (WO) ........................ C05B/17/02

OTHER PUBLICATIONS

Dr. N.S. Bolan et al., "Influence of Low–Molecular–Weight Organic Acids On The Solubilization of Phosphates" 1994, pp. 311–319. (No month).

* cited by examiner

Primary Examiner—Wayne Langel
(74) Attorney, Agent, or Firm—Jones, Day, Reavis & Pogue

(57) ABSTRACT

The present invention relates to a solid water soluble fertilizer composition containing one or more fertilizer materials and a phosphate free, organic acid which is solid at ambient temperatures. The fertilizer materials include primary macro nutrients, secondary macro nutrients, micro nutrients and mixtures thereof. The organic acid has a water solubility of at least 10 g/l (at 25° C.) and an acidifying effect in the range of 0.5 to 1.3 g $HCO_3^-$/g acid. The acidifying effect is defined as the amount of $HCO_3^-$ that can be transformed into $H_2CO_3$ per gram of acid and is calculated in accordance with the following formula:

$$61 \frac{n}{M_{w,acid}}$$

wherein $M_{w,acid}$ is the molecular weight of said acid and n represents the number of dissociation constants (i.e., pKa values) of the acid below the value of 6.35. The acid should be present in the composition in an amount sufficient to reduce the $HCO_3^-$ level in water treated with the composition by between about 60–400 parts per million when applied to the water at a dosage of 1 gram per liter.

31 Claims, No Drawings

WATER SOLUBLE FERTILIZER COMPOSITIONS

BACKGROUND OF THE INVENTION

1. Field of the Invention

The present invention relates to improved water soluble fertilizer compositions. More particularly, it relates to solid fertilizer compositions having sufficiently high acidifying effect (i.e. alkalinity reducing effect) and water solubility to provide stable, precipitate free stock and feed solutions, independent of the phosphorus content thereof.

2. Description of Related Art

In greenhouses, nurseries and other intensive horticulture environments, best plant growth results are achieved when macro and micro nutrients are carefully delivered to the growing plants. Many plant growers choose to utilize compound high analysis water soluble fertilizers for accomplishing this result. Typically, such high analysis fertilizers are marketed as solids which may be dissolved by the user to prepare concentrated stock solutions which are subsequently diluted into irrigation water employing proportioners or injection devices, thereby forming so called "feed solutions".

Generally, it is important to formulate these high analysis fertilizer compositions so that they dissolve quickly and completely with no precipitation. Furthermore, these fertilizer compositions must provide good long-term stability in stock solutions. For example, precipitates in the stock solutions can cause clogging of the proportioners and irrigation lines. These functional requirements for water soluble fertilizer compositions of this variety have presented ongoing problems for producers and developers of such products and these problems have not been fully solved by previously available fertilizer compositions.

For example, when previously conventional fertilizer compositions have been employed for preparing fertilizer irrigation solutions from hard water and/or water having high alkalinity, problems have been encountered with respect to precipitation. Irrigation water having a relatively high alkalinity normally contains a high content of (hydrogen)carbonates and the presence of such materials very often results in precipitation of secondary macro nutrients and micro nutrients (trace elements) from the fertilizer solution. Specifically, calcium is an important secondary macro nutrient which is required in many plant fertilizer compositions. However, a relatively high pH will cause calcium and non-chelated micro nutrients to precipitate in the form of (hydrogen)carbonates, phosphates, sulfates and/or hydroxides.

Heretofore, various solutions have been proposed to decrease the alkalinity and consequently to reduce the precipitation of nutrients. For example, in U.S. Pat. No. 5,830,255 and 5,174,806, phosphorus containing acids were disclosed for use as acidifiers in the fertilizer compositions.

U.S. Pat. No. 5,830,255 describes a liquid fertilizer composition including phosphorous acid ($H_3PO_3$) as the primary macro nutrient. The composition may further include other nutrients and, additionally, contains citric acid. It is taught that this composition improves the uptake by plants of phophites ($PO_3^{3-}$) which are the salts of phosphorous acid. Phosphites are said to be taken up by the foliage of some plants more readily than phosphates and are, therefore, preferred for these plants.

The problem underlying the invention described in U.S. Pat. No. 5,830,255 is the precipitation of phosphates, which are used as primary macro nutrients, which precipitation occurs in conventional fertilizer compositions comprising phosphorous acid and other nutrients. In an attempt to solve this problem, citric acid is included in the fertilizer composition which, when diluted with water having a pH of about 6.5–8.5, results in a pH of 5.0–7.0. The effect of using citric acid is, therefore, lowering of the pH in order to prevent the precipitation of the phosphites.

U.S. Pat. No. 5,174,806 describes a method for preparing a fertilizer composition including phosphoric acid ($H_3PO_4$) as the primary macro nutrient, other nutrients and additionally citric acid and urea. This fertilizer composition is said to be neutral and to prevent the evolution of heat of neutralization between the phosphoric acid and other nutrients such as potassium hydroxide due to the presence of citric acid and urea in the formulation.

However, it should be noted that the use of phosphorus containing acids, such as phosphorous acid and phosphoric acid as proposed in the above-cited prior art, has several disadvantages.

One disadvantage is that phosphorus containing acids are liquids. Therefore, a grower wishing to fertilize with, for example, both calcium and a phosphorus containing acid will need to inject these two elements separately This makes other non-phosphorus containing acids such as nitric acid, sulphuric acid, formic acid, acetic acid and the like, unuseable in the formulation. Another disadvantage is that phosphorus containing acids are hazardous in handling and application. Thirdly, liquid acids cannot be blended properly with solid fertilizer nutrients in powder form to produce a fertilizer composition. Therefore, manufacturing of such compositions, especially with phosphorus containing acids, is troublesome. Additionally, chelates (e.g., being used as micro nutrients) are unstable in combination with liquid acids.

In view of the foregoing disadvantages, other solutions to the problem of decreasing the alkalinity and, consequently, reducing the precipitation of nutrients were sought and one proposal was to use of certain phosphates in the formulation.

For example, International Publication WO 92/013813 describes the application of urea phosphate in water soluble solid fertilizer compositions. This publication discloses that the use of mono-ammonium phosphate (MAP) in fertilizer mixtures with calcium nitrate, magnesium nitrate, ferrous sulphate, manganese sulphate, copper sulphate, zinc sulphate and the like results in solutions with precipitates. However, the publication teaches that when urea phosphate (UP) is employed as the principal phosphorus source in a fertilizer mixture with the same secondary and micro nutrients, the use of UP will permit calcium nitrate, magnesium nitrate and/or metal sulfates to be present in clear, concentrated stock solutions. This is a result that MAP, as the principal phosphorus source, is incapable of providing.

Also, in view of the acidifying effect of UP on irrigation water, alkalinity can be reduced considerably which results in a significant increase in solubility for calcium and non-chelated micro nutrients, especially in case of hard water and/or water of high alkalinity, and the reduction in the concentration of hydrogen carbonate avoids precipitation in irrigation water of high alkalinity. Thus, depending on the alkalinity, water hardness and composition of the fertilizer, this publication teaches that a certain amount of UP in the fertilizer composition is needed.

A disadvantage to the solubility problem solution provided by International Publication WO 92/013813 is that more conventional phosphorus sources, such as mono-ammonium phosphate, mono-potassium phosphate and di-ammonium phosphate, cannot be used, for example, with calcium salts to produce a precipitate free solution. To the contrary, urea phosphate must be used as the principal phosphorus source instead of these more common materials.

Another disadvantage is that for some plants or in some stages of growth, a high phosphorus level in the irrigation water is not desirable. Problems occur when a certain amount of UP is needed for hydrogen carbonate neutralization, i.e. acidifying, effect and, simultaneously, a relatively high phosphorus level is undesirable from a plant growth perspective.

Additionally, other solutions have been proposed heretofore for reducing the precipitation of nutrients in fertilizer compositions.

For example, the application of low-molecular-weight organic acids like oxalic acid, citric acid and the like to the soil to increase the absorption of phosphates, used as primary macro nutrients, by plants is known (Biology and Fertility Soils, Vol. 18, No. 4, 1994, pp. 311–319). The organic acids increase the availability of phosphorus in soils mainly through both decreased adsorption of phosphates to the soil and increased solubility of the phosphorus compounds. These organic acids are applied separately from the phosphates. Accordingly, the fertilizer composition used does not comprise any organic acids.

Another widely postulated proposal for solving the solubility problem is the use of chelated micro nutrients (trace elements) in fertilizer compositions in order to keep the micro nutrients in solution in both stock solution and irrigation water, containing phosphate salts as well. The use of chelated micro nutrients is necessary since when non-chelated micro nutrients (such as simple nitrates or sulfates) are used with conventional phosphorous sources, the micro nutrients tend to precipitate. A disadvantage of such use is that chelated micro nutrients increase the cost of the fertilizer compositions considerably.

Thirdly, the application of several types of acids which have a complex-forming (i.e. chelating) effect are well known in fertilizer compositions to stabilize metals (such as micro nutrients) by avoiding precipitation of the metals. Examples of such acids include ethylene diamine tetraacetic acid (EDTA), diethylene triamine pentaacetic acid (DTPA) and the like. A disadvantage is that these chelating acids are not soluble enough (less than 10 g/l at 25° C.) to be used in solid water soluble fertilizers. Moreover, these acids have a low acidifying effect.

SUMMARY OF THE INVENTION

In view of the above discussed disadvantages of prior art fertilizer compositions and, furthermore, in view of the demands of fertilizers in general, it is a primary object of the present invention to provide nutrients for plants in a fertilizer composition that renders these nutrients readily available to the plants through irrigation.

It is a further object of the present invention to provide fertilizer compositions in which the nutrients present do not precipitate, even when hard water and/or water of high alkalinity is used as the irrigation water.

The foregoing and other objects of the invention are achieved by providing a solid fertilizer composition having sufficiently high acidifying, i.e. alkalinity reducing, effect and water solubility to provide a stable, precipitate free stock and feed solution, independent of the phosphorus content of the composition.

More specifically, fertilizer compositions in accordance with the present invention are water soluble, solid compositions containing phosphorus free, organic acids which are solid at ambient temperature, and one or more fertilizer materials. Suitable fertilizer materials for inclusion in the fertilizer compositions include primary macro nutrients, secondary macro nutrients, micro nutrients and mixtures thereof. The primary macro nutrients include phosphorus, nitrogen and potassium containing macro nutrients. Preferably, phosphorus containing macro nutrients are present in the form of phosphates.

Solid, phosphorus free, organic acids suitable for use in the present invention must have a water solubility of at least 10 grams/liter (at 25° C.) and an acidifying effect in the range of 0.5 to 1.3 g $HCO_3^-$/gram of acid. The acidifying effect of the acid is defined as being the amount of $HCO_3^-$ that can be transformed into $H_2CO_3$ per gram of the acid and is calculated in accordance with the following formula:

$$61 \frac{n}{M_{w,acid}}$$

wherein $M_{w,acid}$ is the molecular weight of said acid and n represents the number of dissociation constants (i.e., pKa values) of the acid below 6.35, Furthermore, in accordance with the present invention, the water soluble, solid fertilizer compositions having the above described solid, phosphorus free, organic acids incorporated therein must provide a sufficient acidifying effect when dissolved in water such as a hard and/or high alkalinity irrigation water stream to prevent precipitation of the nutrients therein. In this regard, it has been found that the compositions of the present invention, preferably, should be dissolved in water in an amount sufficient to reduce the $HCO_3^-$ level in the water treated with the composition by between about 60 and about 400 parts per million when the composition is applied to the water at a dosage of 1 gram per liter as measured by the formula wherein the acidity effect of the fertilizer compositions are calculated by determining the sum of the acidifying effects of the particular acids present in the fertilizer composition on a percentage weight/weight basis:

$$Ac_{product} = \sum_{i=1}^{m} 61 \cdot \frac{n}{M_{w,acid\ i}} \cdot f \cdot 1000 \ [ppm\ HCO_3^-]$$

wherein:

$Ac_{product}$ is the overall acidifying effect of a fertilizer product in parts per million (ppm) $HCO_3^-$ at a dosage of 1 gram of water soluble fertilizer per liter of water;

61 is the molecular weight of bicarbonate or $HCO_3^-$ n represents the number of dissociation constants (pKa) of the acid in the composition which are equal to or less than pka-value of 6.35 (i.e., the pKa value of carbonic acid); $M_{w,acid}$ is the molecular weight of the acid and is expressed in grams/mole of fertilizer composition;

f is the (dimensionless) weight fraction of the acid in the fertilizer composition;

m is the number of acids in the fertilizer composition acid having an acidifying effect; and 1000 is a conversion factor for converting grams into milligrams or ppm.

Exemplary of the advantages resulting from use of the fertilizer compositions of the present invention are the following:

1. The ability to prepare and apply a complete nutrient solution with only one stock solution, made from a fertilizer composition of the present invention, and one proportioner.

2. The ability to use non-chelated secondary macro nutrients (such as simple calcium salts) and non-chelated micro nutrient trace elements without reduction in solubility in the stock solution which is not possible if conventional dry phosphorus sources without said solid acids are used.

3. Solid acidic fertilizers are significantly less hazardous to the end user than liquid fertilizer compositions based on phosphorus containing acids.

4. The ability to prepare precipitate free feed solutions from stock solutions, made from the fertilizer composition of the present invention and hard water and/or water of high alkalinity. Both the reduction of the amount of hydrogencarbonate (alkalinity) in the irrigation water and the decrease in pH cause good solubility.

5. The ability to formulate acidifying fertilizer compositions without influencing the phosphorus level directly. This is not possible using urea phosphate (UP) according to prior art techniques such as those described in International Publication WO. The hydrogencarbonate reducing (i.e. acidifying) effect of the solid acids employed in the compositions of the present invention is much higher than that of UP and, as a result, a smaller amount of the composition is required.

DETAILED DESCRIPTION OF THE PREFERRED EMBODIMENTS

The present invention provides a water soluble, solid fertilizer composition comprising a phosphorus free organic acid, the acid being solid at ambient temperature, and one or more fertilizer materials selected from the group consisting of primary macro nutrients, secondary macro nutrients and micro nutrients. The fertilizer compositions are dry solid materials. They are particulate, flowing solids having a free water content of less than about 10% by weight of the total composition and contain a solid acid having an acidifying effect between about 0.5 and about 1.3 grams $HCO_3^-$ per gram acid and a solubility of at least about 10 grams per liter water under standard conditions (25° C.) when the fertilizer composition is dissolved in water to provide an aqueous solution. The acidifying effect is preferably between about 0.5 to about 1.3 grams $HCO_{30}^-$ per gram of acid, preferably about 0.9 to about 1.3 grams $HCO_3^-$ per gram of acid with the acidifying effect being defined as the amount of $HCO_3^-$ that can be transformed into $H_2CO_3$ per gram of the acid, which amount is calculated employing the following formula:

$$61 \frac{n}{M_{w,acid}}$$

wherein $M_{w,acid}$ is the molecular weight of the acid and n represents the number of dissociation constants (i.e., pKa values) of the acid below 6.35 and any phosphorus containing macro nutrients in the composition are in the form of phosphates, preferably mono-ammonium phosphate, di-ammonium phosphate, mono-potassium phosphate and tri-potassium phosphate.

The acid component of the composition is preferably present in an amount of about 2 to about 90%, and more preferably about 5 to about 40%, by weight of the composition.

A low acidifying effect, i.e. less than about 0.5 gram $HCO_3^-$ per gram acid, is disadvantageous since the lower the acidifying effect the greater the amount of the acid that has to be incorporated in the fertilizer composition.

The solid acid is preferably selected from the group consisting of malonic acid (dicarboxylic acid), DL-malic acid ((±)-2-hydroxysuccinic acid), maleic acid (cis-butenedioic acid), succinic acid (butane dioic acid), itaconic acid (methylenesuccinic acid), glutaric acid (1,5-pentanedioic acid), glycolic acid (hydroxyacetic acid), tricarballylic acid (1,2,3-propanetricarboxylic acid), adipic acid (hexanedioic acid), pimelic acid (heptanedioic acid), citric acid (2hydroxy-1,2,3-propanetricarboxylic acid), maleic anhydride (2,5-furanedione) and succinic anhydride.

Oxalic acid and DL-tartaric acid (DL-dihydrosuccinic acid) are not included as suitable solid acids.

The amount of solid acid to be added depends on the hardness and/or alkalinity of the water to be applied, the amount of calcium, phosphates and non-chelated trace elements needed in the product and the value for the acidifying effect of the solid acid.

Two types of water hardness which have been recognized heretofore are general hardness (GH) and carbonate hardness (KH). A third term commonly used in this field is total hardness which is a combination of GH and KH. Since it is important to know both the GH and KH, the use of total hardness can be misleading and should be avoided. General Hardness is primarily the measure of calcium ($Ca^{2+}$) and magnesium ($Mg^{2+}$) ions in the water. GH is commonly expressed in parts per million (ppm) of calcium carbonate ($CaCO_3$), degrees hardness (dH) or, more properly, the molar concentration of $CaCO_3$. One German degree hardness (dH) is 10 mg of calcium oxide (CaO) per liter. In the U.S., hardness is usually measured in ppm of $CaCO_3$. A German dH is 17.8 ppm $CaCO_3$. A molar concentration of 1 milli-equivalent per liter (mEq/l)=2.8 dH=50 ppm. Water hardness follows the guidelines:

0–4 dH, 0–70 ppm:very soft
4–8 dH, 70–140ppm:soft
8–12 dH, 140–210 ppm:medium hard
12–18 dH, 210–320 ppm:fairly hard
18–30 dH, 320–530 ppm:hard Carbonate hardness (KH) is the measure of hydrogen carbonate ($HCO_3^-$) and carbonate ($CO_3^{2-}$) ions in water. Alkalinity is the measure of the total acid binding capacity (all the anions which can bind with free $H^+$) but is comprised mostly of carbonate hardness in fresh water systems. Thus, the terms carbonate hardness, acid binding, acid buffering capacity and alkalinity are used interchangeably. KH is generally referred to in degrees hardness and is expressed in $CaCO_3$ equivalents just like GH.

As employed herein, the term "hard water" refers to water containing relatively high levels of $Ca^{2+}$ and/or $Mg^{2+}$ (high GH) whereas the term "high alkalinity water" refers to water having a high level of hydrogencarbonate (high KH).

As previously discussed, the intrinsic acidifying effect of the organic acid used in the fertilizer composition, has been defined as the quantity of hydrogen carbonate (in grams) that can be transformed into carbonic acid per gram of acid, and can be determined by the following formula:

$$61 \frac{n}{M_{w,acid}}$$

wherein $M_{w,acid}$ is the molecular weight of the acid and n represents the number of dissociation constants of the acid below a pka-value of 6.35. In other words, n corresponds to the number of dissociation/protonation steps having a value lower than 6.35, which is the first logarithmic dissociation/protonation constant of carbonic acid (e.g., see Handbook of Chemistry and Physics, David R. Lide, 76$^{th}$ Edition, 1995–1996). In general it can be stated that n represents the number of protons available per molecule of acid able to transform hydrogen carbonate, $HCO_3^-$, into carbonic acid, $H_2CO_3$. Carbonic acid disscociates into water and carbon dioxide under normal conditions. The number 61 is the molecular weight of hydrogen carbonate (in grams/mole).

The determination of the acidifying effect of the acids can be exemplified as follows for two representative acids:
Malonic acid:
  $M_{w,malonic}$=104 g/mol
  n=2 ($pK_1$=2.83, $pK_2$=5.69)
  Accordingly, malonic acid has an acidifying effect of 1.2 grams $HCO_3^-$/gram acid as calculated employing the foregoing formula for the acidifying effect of an acid.
Citric acid:
  $M_{w,citric}$=192 g/mol
  n=2 ($pK_1$=3.14, $pK_2$=4.77, $pK_3$=6.39)
  Accordingly, malonic acid has an acidifying effect of 0.6 grams $HCO_3^-$/gram acid as calculated employing the foregoing formula for the acidifying effect of an acid. In this regard, it should be noted that the third protonation/dissociation constant of citric acid is not taken into account in calculating the acidifying effect of citric acid since that $pK_3$ value is greater than 6.35.)

In accordance with the present invention, the total acidifying effect of a fertilizer composition containing the organic acids which is dissolved in water to provide an aqueous solution can be determined by multiplying the acidifying effect of each acid present in the composition by the weight fraction of the acid incorporated in the fertilizer composition. Specifically, the fertilizer compositions of this invention are formulated so that the $HCO_3^-$ level in water will be reduced by between about 60 and about 400 parts per million when the composition is dissolved in the water at a dosage of 1 gram per liter of water as measured by the formula:

$$Ac_{product} = \sum_{i=1}^{m} 61 \cdot \frac{n}{M_{w,acid\ i}} \cdot f \cdot 1000 \quad [ppm\ HCO_3^-]$$

wherein:
  $Ac_{product}$ is the overall acidifying effect of a fertilizer product in parts per million (ppm) $HCO_3^-$ at a dosage of 1 gram of water soluble fertilizer per liter of water;
  61 is the molecular weight of bicarbonate or $HCO_3^-$ n represents the number of dissociation constants (pKa) of the acid in the composition which are equal to or less than pka-value of 6.35 (i.e., the pKa value of carbonic acid);
  $M_{w,acid}$ is the molecular weight of the acid and is expressed in grams/mole of fertilizer composition;
  f is the (dimensionless) weight fraction of the acid in the fertilizer composition;
  m is the number of acids in the fertilizer composition acid having an acidifying effect; and
  1000 is a conversion factor for converting grams into milligrams or ppm.

Thus, for example, assuming that the carbonate hardness of water to be treated is 250 ppm $HCO_3^-$ (which is considered to be fairly hard water) and assuming that it would be desirable to end up with a residual hardness of only 70 ppm $HCO_3^-$ in the feed solution after application of a solid water soluble fertilizer in a concentration of 1 gram per liter of water, a fertilizer composition having an acidifying effect of 180 ppm $HCO_3^-$ would be required. A composition in accordance with the present invention which enables this result is as follows:

|  | w/w % |
|---|---|
| Composition 1. | |
| Fertilizer 10-14-27 | |
| NPK and acid containing compounds | |
| Mono ammonium phosphate | 23 |
| Potassium nitrate | 58.6 |
| Maleic acid | 17.1 |
| Trace elements containing compounds | |
| Boric acid | 0.090 |
| Cobalt sulfate | 0.003 |
| Copper sulfate | 0.042 |
| Iron-EDTA | 0.900 |
| Manganese sulfate | 0.155 |
| Sodium molybdate | 0.025 |
| Zinc sulfate | 0.085 |
| total | 100.00 |

It should be noted that the only acid in the above formulation for the 10-14-27 fertilizer composition which contributes to the acidifying effect is maleic acid and maleic acid can be characterized as follows in terms of the variables in the foregoing formula for determining the acidifying effect of a composition of this invention:

| Maleic Acid: | |
|---|---|
| $M_{w,\ maleic\ acid}$ | = 116 g/mol |
| $pK_1$ | = 1.83 |
| $pK_2$ | = 6.07 |
| n | = 2 |
| f | = 0.17 |

Accordingly, the acidifying effect of the 10-14-27 fertilizer composition ($Ac_{product}$) can be calculated as being 179 ppm $HCO_3^-$ as maleic acid is the only acid in the composition having an acidifying effect.

It should be further noted that the NPK-ratios of the above 10-14-27 fertilizer composition correspond to the needs of a particular plant in a particular stage of growth. To the contrary, the same NPK-ratios and acidifying effect cannot be achieved employing urea phosphate (UP) as the acidifier in view of the significantly lower acidifying effect of UP relative to maleic acid and the negative influence UP exerts on both phosphorous and nitrogen content.

With regard to the primary macro nutrients for use in the compositions of this invention, they are selected from the group consisting of phosphorus, nitrogen and potassium containing macro nutrients.

Preferred nitrogen containing macro nutrients include nitrates, ammonium salts and urea derivatives. Preferred potassium containing macro nutrients include potassium salts.

The primary macro nutrients are preferably present in the composition in an amount of about 1 to about 99% by weight of the composition.

The preferred secondary macro nutrients for use in the compositions of the present invention include non-chelated elements consisting of calcium, magnesium and sulfate salts.

The secondary macro nutrients are preferably present in the composition in an amount of about 0.1 to about 99% by weight of the composition.

Preferred micro nutrients for use in the compositions include non-chelated elements consisting of iron, molybdenum, manganese, copper, zinc and cobalt sulphates and nitrates, boric acid and molybdates.

The micro nutrients are preferably present in the compositions in an amount of about 0.1 to about 50% by weight of the composition.

According to one embodiment of this invention, the fertilizer composition contains about 2 to about 90% and, preferably, about 5 to about 40% of the acid, and about 10 to about 99% and, preferably, about 60 to about 95% of other fertilizer materials by weight of the composition.

According to another embodiment, the fertilizer composition of the present invention contain about 2 to about 90% and, preferably, about 5 to about 40% of the acid; about 1 to about 99% and, preferably, about 5 to about 95% mono-ammonium phosphate or mono-potassium phosphate; about 0.1 to about 99% and, preferably, about 5 to about 5% calcium nitrate, and about 0 to about 75% of other fertilizer materials by weight of the composition.

According to yet another embodiment of this invention, the fertilizer composition contains about 2 to about 90% and, preferably, about 5 to about 40% of the acid; about 1 to about 99% and, preferably, about 5 to about 94% mono-ammonium phosphate or mono-potassium phosphate; about 1 to about 99% and, preferably, about 5 to about 94% calcium nitrate; about 0.1 to about 50% and, preferably, about 1 to about 40% trace metal sulfates and nitrates, and about 0 to about 75% of other fertilizer materials (including magnesium nitrate) by weight of the composition.

In a still further embodiment of this invention, the fertilizer composition includes about 2 to about 90% and, preferably, about 5 to about 40% of the acid; about 1 to about 99% and, preferably, about 5 to about 94% mono-ammonium phosphate or mono-potassium phosphate; about 0.1 to about 50% and, preferably, about 1 to about 40% trace metal sulfates and nitrates; and about 0 to about 75% of other fertilizer materials by weight of the composition.

In yet another embodiment of this invention, the fertilizer composition does not include any phosphorus containing macro nutrients therein.

Examples of phosphorus, nitrogen and potassium containing macro nutrients to be included in the fertilizer composition of the present invention are ammonium nitrate, urea, ammonium sulphate, sodium nitrate, mono-ammonium phosphate, di-ammonium phosphate, mono-potassium phosphate, tri-potassium phosphate, potassium nitrate, potassium sulphate, potassium chloride, magnesium nitrate, calcium nitrate and the like.

The range of fertilizer compositions falling within the scope of the present invention are those having a phosphorus content (as wt. % $P_2O_5$) of from about 0 to about 60%, nitrogen content (as wt. % N) of from about 0 to about 45% and potassium content (as wt. % $K_2O$) of from about 0 to about 60%.

In addition to phosphorus, nitrogen and potassium containing primary macro nutrients, elements such as calcium and magnesium (i.e., secondary macro nutrients) and iron, manganese, copper, boron, zinc, molybdenum and cobalt (i.e., micro nutrients) can be included in the fertilizer composition of the present invention as other fertilizer materials.

These elements may in practice for example be included in the concentration ranges listed in the following Table 1:.

TABLE 1

| Nutrient | Concentration range in final dry product (wt. %) |
| --- | --- |
| Ca | 0–15 |
| Mg | 0–5.0 |
| Fe | 0–1.0 |
| Mn | 0–1.0 |
| Cu | 0–0.5 |
| B | 0–1.0 |
| Zn | 0–1.0 |
| Mo | 0–0.2 |
| Co | 0–0.1 |

Importantly, the elements from the secondary macro nutrients and micro nutrients do not have to be included in chelated form, such as EDTA or DTPA chelates or the like, but can rather be added as simple metal salts, especially nitrates or sulphates. Boron may be included as boric acid. Molybdenum may be provided as an alkali metal or ammonium molybdate. Magnesium can be present as magnesium nitrate.

The non-chelated secondary macro nutrients and micro nutrients include: calcium nitrate, magnesium nitrate, magnesium sulphate, ammonium sulphate, potassium sulphate, ferrous sulphate, ferrous nitrate, manganese sulphate, manganese nitrate, copper sulphate, copper nitrate, boric acid, zinc sulphate, zinc nitrate, sodium molybdate, ammonium molybdate and the like.

Of course, although not necessary, chelated metal salts such as Ca-EDTA, Mg-EDTA, iron-EDTA, iron-DTPA and copper-EDTA may be used as secondary macro nutrients and micro nutrients.

In addition, the fertilizer composition of the present invention can contain additional materials such as cofactors, if desired.

The above nutrients are mixed as solids. The resulting products are dry solids as defined above. They should be stored in a water resistant packaging to minimize caking or lumping. Also other soluble inerts (dyes, anti-caking agents, etc) may be added to these fertilizer compositions.

The solid fertilizer compositions of the present invention are made up into stock solutions and finally into feed solutions by dissolving in water. This should be carried out in clean equipment usually with some agitation. Commonly, the concentration of the fertilizer composition in the stock solution is from about 5% to about 40% by weight of the solution, more preferably from about 10 to 20% by weight of the solution. This stock solution material is diluted by a factor of from about 10 to 200 for application to the plants which gives the final feed concentrations. Preferably, the concentration of the fertilizer composition in the feed solution is from about 0.05% to about 1% by weight of the solution, more preferably from about 0.1 to about 0.15% by weight of the solution.

The use of solid acids having a relatively high acidifying effect and water solubility in a dry blended mixture of nutrients which may include mono-ammonium phosphate, calcium, and optionally magnesium and/or trace metals in non-chelated forms such as nitrates and/or sulfates, offers several advantages.

For one, the acid establishes a low pH condition when the blended mixture is added to water to make a concentrated stock solution. For a stock solution, a pH in the range of 1 to 4 may be achieved. This low solution pH maintains solubility and clarity of the concentrated stock solution. The acid mentioned before, through the effect it has on solution pH, prevents the formation of calcium phosphate, magnesium phosphate and micro nutrient trace metal phosphate, which are not soluble under regular circumstances.

Similarly, the low pH helps to prevent calcium from precipitating in the presence of sulphate and/or phosphate ions which may be present.

Therefore, when a solid acid as defined before is used in combination with mono-ammonium phosphate as a primary phosphorus source, it will be possible to include phosphorus and a metal such as calcium, magnesium or a micro nutrient trace element like iron in one compound fertilizer composition, without the use of chelates or the disadvantage of a precipitate forming. This allows the end user to prepare and apply a complete nutrient solution using one stock solution and utilizing one injector. It enables also the use of non-chelated trace nutrients into phosphorus-containing nutrient solutions without precipitation.

However, precipitation can also occur in the feed solution in case a regular water soluble fertilizer is used in combination with hard water and/or water of high alkalinity. This is caused by the relatively high pH, large amount of hydrogen carbonates and calcium ions. Micro nutrient trace elements also tend to precipitate under these circumstances if they are not applied in a chelated state. Also calcium present in water will precipitate and form gypsum with sulphates coming from the fertilizer. Solid acids, as mentioned before, result in a reduction of both the amount of hydrogen carbonates and pH which result in a better solubility. This avoids precipitation of calcium phosphates, sulphates and/or carbonates and non-chelated micro nutrient trace elements in phosphate, carbonate, sulphate or hydroxide form.

The usage of solid acids in a compound fertilizer product also allows the fertilizer solution to have an increased acidifying effect on the growing medium if needed.

Oxalic acid having an acidifying effect of 1.35 g $HCO_3^-$/g acid and tartaric acid, which are solid acids at ambient temperature, are not considered to be appropriate acids as they precipitate with both calcium and micro nutrient trace elements in non-chelated form.

Urea phosphate has an acidifying effect of only 0.35 g $HCO_3^-$/g. In case of water of high alkalinity a fertilizer composition containing a large amount of urea phosphate would be needed. This directly results in a high phosphorus level which is not desirable for certain plants or stages of growth. The solid acids used in the fertilizer composition of the present invention do not influence phosphorous levels.

The fertilizer composition of the present invention will be further described and advantages thereof will be made apparent with reference to the following Examples which are provided to illustrate the practice of the invention and not to limit its scope of the invention as defined by the appended claims. All percentages are by weight unless otherwise indicated.

EXAMPLE 1

Several sample stock solutions in demineralized water were prepared using various combinations of nutrients without the presence of an organic acid. The nutrients included materials which are commonly used in the manufacture of water soluble fertilizers. The most widely used source of phosphorus is mono-ammonium phosphate (MAP) which was compared with urea phosphate (UP). The compositions of the various stock solutions are included in the following Table 2.

TABLE 2

| Sample No. | MAP (g/l) | UP (g/l) | $CaNO_3$ (g/l) | $FeSO_4$ (g/l) | $MgNO_3$ (g/l) | $MnSO_4$ (g/l) | $CuSO_4$ (g/l) | $ZnSO_4$ (g/l) |
|---|---|---|---|---|---|---|---|---|
| 1 | 1 | | 100 | | | | | |
| 2 | 10 | | 10 | | | | | |
| 3 | 100 | | 100 | | | | | |
| 4 | 10 | | | 10 | | | | |
| 5 | 100 | | | 100 | | | | |
| 6 | 150 | | 150 | | 150 | | | |
| 7 | 50 | | 95 | 1 | | 0,5 | 0,25 | 0,5 |
| 8 | | 1 | 100 | | | | | |
| 9 | | 10 | 10 | | | | | |
| 10 | | 100 | 100 | | | | | |
| 11 | | 10 | | 10 | | | | |
| 12 | | 100 | | 100 | | | | |
| 13 | | 150 | 150 | | 150 | | | |
| 14 | | 50 | 95 | 1 | | 0,5 | 0,25 | 0,5 |

The stability of the water solubility of the nutrients dissolved in the various stock solutions (Samples 1–14) was assessed by observing whether precipitation occurred within a period of 30 days.

As a result of this observation, It appeared that when MAP is used as the sole phosphorus source in mixtures with calcium nitrate, magnesium nitrate, ferrous sulphate, manganese sulphate, copper sulphate and/or zinc sulphate (e.g, as in tabulated Samples 1–7), precipitation occurs and that when UP is used instead of MAP (see tabulated Samples 8–14) precipitation does not occur. These results confirm the findings disclosed in International Publication WO 92/013813 which is discussed above.

EXAMPLE 2

Several stock solutions were prepared and the stability thereof was assessed in the same manner as described in Examples 1, with the exception that MAP was used as the sole phosphorus source and that an organic acid, such as citric acid, maleic acid or malonic acid was added to the composition. The compositions of the various stock solutions are included in the following Table 3.

TABLE 3

| Sample No. | MAP (g/l) | citric acid (g/l) | maleic acid (g/l) | malonic acid (g/l) | CaNO$_3$ (g/l) | FeSO$_4$ (g/l) | MgNO$_3$ (g/l) | MnSO$_4$ (g/l) | CuSO$_4$ (g/l) | ZnSO$_4$ (g/l) |
|---|---|---|---|---|---|---|---|---|---|---|
| 1  | 1   | 0.61 |      |      | 100 |     |     |     |     |     |
| 2  | 10  | 6.1  |      |      | 10  |     |     |     |     |     |
| 3  | 100 | 61   |      |      | 100 |     |     |     |     |     |
| 4  | 10  | 6.1  |      |      |     | 10  |     |     |     |     |
| 5  | 100 | 61   |      |      |     | 100 |     |     |     |     |
| 6  | 150 | 91.5 |      |      | 150 |     | 150 |     |     |     |
| 7  | 50  | 30   |      |      | 95  | 1   |     | 0,5 | 0,25| 0,5 |
| 8  | 1   |      | 0.37 |      | 100 |     |     |     |     |     |
| 9  | 10  |      | 3.7  |      | 10  |     |     |     |     |     |
| 10 | 100 |      | 37   |      | 100 |     |     |     |     |     |
| 11 | 10  |      | 3.7  |      |     | 10  |     |     |     |     |
| 12 | 100 |      | 37   |      |     | 100 |     |     |     |     |
| 13 | 150 |      | 55   |      | 150 |     | 150 |     |     |     |
| 14 | 50  |      | 18   |      | 95  | 1   |     | 0,5 | 0,25| 0,5 |
| 15 | 1   |      |      | 0.33 | 100 |     |     |     |     |     |
| 16 | 10  |      |      | 3.3  | 10  |     |     |     |     |     |
| 17 | 100 |      |      | 33   | 100 |     |     |     |     |     |
| 18 | 10  |      |      | 3.3  |     | 10  |     |     |     |     |
| 19 | 100 |      |      | 33   |     | 100 |     |     |     |     |
| 20 | 150 |      |      | 49   | 150 |     | 150 |     |     |     |
| 21 | 50  |      |      | 16   | 95  | 1   |     | 0,5 | 0,25| 0,5 |

It was observed that within a period of 30 days following preparation of the stock solutions (Samples 1–21), precipitation did not appear in any of these stock solution in accordance with the present invention.

Accordingly, the data developed in Examples 2 is believed to demonstrate that the use of a solid organic acid in accordance with this invention will enable MAP, calcium nitrate, magnesium nitrate and/or metal sulfates to be present in stable, clear, concentrated stock solutions without precipitation. In this regard, it should be noted that the results observed in Example 1 demonstrate that MAP, as a phosphorus source alone, is incapable of providing such stable, clear, concentrated stock solutions. Furthermore, it should be understood that although UP is capable of providing a clear solution, the use of UP has some clear disadvantages as mentioned in the above discussion of International Publication WO 92/013813.

Therefore, for example, it can be concluded that by adding an organic acid in accordance with this invention to a stock solution including MAP as the sole phosphorus source, precipitation of the nutrients is prevented and, likewise, the water solubility thereof is stabilized.

EXAMPLE 3

The solubility of several water soluble fertilizer compositions having a relatively high phosphate level in hard water having high alkalinity was tested in both a stock and feed solution at room temperature (25° C.). Aspects such as precipitation, turbidity and pH were taken into account. The turbidity was measured by a turbidity meter (Orbeco-Hellige) and expressed in Number of Turbidity Units (NTU). The higher the turbidity the higher the amount of insolubles.

The components of the basic composition prepared for the various sample fertilizer compositions to be tested in this Example are listed in the following Table 4:

TABLE 4

| Basic Composition Fertilizer 10-50-10 | Weight percent (wt. %) |
|---|---|
| Primary macro nutrients | |
| Urea | 4.18 |
| Ammonium sulphate | 4.64 |
| Mono-ammonium phosphate | 61.25 |
| Mono-potassium phosphate | 24.36 |
| Potassium sulphate | 4.18 |
| Micro nutrients | |
| Boric acid | 0.096 |
| Cobalt sulphate | 0.004 |
| Copper sulphate | 0.045 |
| Iron-EDTA | 0.956 |
| Manganese sulphate | 0.166 |
| Sodium molybdate | 0.024 |
| Zinc sulphate | 0.094 |
| Total | 100.00 |

Normally hard water contains sufficient calcium and magnesium with respect to the needs of the plant, therefore no calcium or magnesium is needed in this product. Additionally, it should be noted that the fertilizer composition contains a rather high amount of phosphates and contains sulfates and non-chelated trace elements.

With the addition of calcium chloride and sodium hydrogencarbonate in the water supply, water of an alkalinity of 350 ppm HCO$_3^-$ and a hardness of 350 ppm CaCO$_3$ was prepared. The room temperature was 25° C. The obtained pH was 7.8.

Various organic acids were incorporated into the basic composition (see Table 4) in accordance with the present invention to form Samples 4–21 listed in Table 5 hereinafter. As controls, Sample 1 was prepared containing no acid additive and Samples 2–3 were prepared containing urea phosphate. The weight fractions (wt. %) of the acids added, based on the total amount of basic composition employed and the acid added are listed in Table 5 as follows:

TABLE 5

| Sample Nos. | Acid added | Weight fraction | Precipitation Stock | Precipitation Feed | Turbidity (NTU) Stock | Turbidity (NTU) Feed | pH Stock | pH Feed |
|---|---|---|---|---|---|---|---|---|
| 1 | none | — | Yes | Yes | 390 | 20 | 4.3 | 6.2 |
| 2 | urea phosphate | 0.718 | No | No | 0 | 0 | 2.4 | 3.1 |
| 3 | urea phosphate | 0.359 | No | No | 0 | 0 | 2.7 | 5.4 |
| 4 | oxalic acid | 0.207 | Yes | Yes | 710 | 450 | 2.6 | 3.3 |
| 5 | malonic acid | 0.239 | No | No | 0 | 0 | 2.9 | 4.7 |
| 6 | malonic acid | 0.120 | No | No | 0 | 0 | 3.2 | 5.6 |
| 7 | succinic acid | 0.272 | No | No | 73 | 0 | 3.5 | 4.8 |
| 8 | succinic anhydride | 0.230 | No | No | 75 | 0 | 3.5 | 4.8 |
| 9 | maleic acid | 0.267 | No | No | 0 | 0 | 2.7 | 4.9 |
| 10 | maleic acid | 0.134 | No | No | 0 | 0 | 3.0 | 5.6 |
| 11 | maleic anhydride | 0.226 | No | No | 0 | 0 | 2.7 | 49 |
| 12 | DL-malic acid | 0.308 | No | No | 0 | 0 | 3.2 | 4.3 |
| 13 | L(+)-tartaric acid | 0.346 | Yes | No | 660 | 0 | 2.7 | 3.7 |
| 14 | itaconic acid | 0.298 | No | No | 0 | 0 | 3.4 | 4.9 |
| 15 | glutaric acid | 0.304 | No | No | 0 | 0 | 3.6 | 4.8 |
| 16 | adipic acid | 0.337 | No | No | 0 | 0 | 3.8 | 5.1 |
| 17 | pimelic acid | 0.368 | No | No | 0 | 0 | 3.9 | 5.3 |
| 18 | glycolic acid | 0.350 | No | No | 0 | 0 | 3.2 | 4.0 |
| 19 | tricarballylic acid | 0.269 | Yes | No | 20 | 0 | 3.4 | 5.0 |
| 20 | citric acid | 0.444 | No | No | 0 | 0 | 3.0 | 4.0 |
| 21 | citric acid | 0.222 | No | No | 0 | 0 | 3.2 | 5.1 |

In preparing the Samples 1–15 and 17–21 for testing in this Example 3, the solid acids were mixed with the basic composition before dissolving the mixture in 1 liter of the high alkalinity, hard water. Then, a stock solution was prepared containing 100 grams of the basic composition having the acid dissolved therein per liter of water. Successively, this stock solution was diluted 100 times to obtain a final feed solution of 1 gram of basic composition having the acid dissolved therein per liter of water.

In the case of the samples prepared with adipic acid (Sample 16) and pimelic acid (Sample 17, a stock solution of only 10 grams/liter was prepared as the solubility of these acids had to be taken into account. However, for all acids present in the test Samples 2–21 listed in Table 5, an amount of acid was added corresponding to an acidifying effect of 280 ppm $HCO_3^-$ to maintain a residual amount of $HCO_3^-$ of about 70 ppm. In some cases (Samples 3, 6, 10 and 21) half of this amount was chosen to test in order to judge whether smaller amounts of acid can also result in clear solutions.

The stability of the water solubility of the nutrients dissolved in the various stock and feed solutions was assessed by observing whether precipitation occurred and by measuring the turbidity and pH of the solution. The results obtained are listed in Table 5 under the heading "Precipitation".

In reviewing the tabulated results, it should be noted that as a result of the relatively high level of phosphates in the water, the presence of sulfates and non-chelated trace elements in the basic composition in combination with the hard water (high Ca level) of high alkalinity (high $HCO_3^-$ level), precipitation normally occurs. When no acid is added to the composition (Sample 1) precipitation indeed occurs, both in the stock and feed solution.

However, in view of the addition of a specified amounts of the acids in the samples, precipitation was avoided, both in the stock and feed solutions.

In order to reduce the pH as much as possible and to avoid a pH drop, it is advisable to apply a fertilizer containing an amount of acid which will leave a residual amount of hydrogencarbonate in the feed solution of 70 ppm. Nevertheless, depending on both the composition of the fertilizer and the hardness and/or alkalinity of the water used, smaller or even higher amounts can be used advantageously.

For satisfactory application of the fertilizer compositions of this invention it is critical that the feed solution is absolutely precipitate free. This will guarantee that all nutrients will be available to the plant and that precipitates will not block the irrigation system. In this respect, compositions according to Sample 1 (no acid added) and Sample 4 (oxalic acid) of this Example will result in significant problems in practice and are, therefore, not desirable. Of course, stock solutions also need to be optically clear and precipitate free. Also, the higher the concentration of a stock solution, the better.

As can be seen from the results tabulated in Table 5, the solid acids dissolved in the formulations are able to avoid precipitation in both feed and stock solution, except for oxalic acid (Sample 4) and L(+)tartaric acid (Sample 13). It is known that oxalate precipitates with calcium. From the results, it is expected that tartarate also precipitates with calcium. So oxalic and tartaric acid are not considered to be appropriate for reducing the pH of high alkalinity hard water.

EXAMPLE 4

The solubility of several water soluble fertilizer compositions having a relatively high phosphate level in soft water of low alkalinity was tested in both a stock and feed solution at room temperature (25° C.).

Because soft water generally does not contain sufficient calcium and magnesium with respect to the needs of a plant, calcium and magnesium compounds (CaO and MgO, respectively) were incorporated into a basic composition prepared with the components listed in the following Table 6. It should be noted that this basic composition contains a rather high amount of phosphates and, also, contains sulfates and non-chelated trace elements.

TABLE 6

| | Weight percent (wt. %) |
|---|---|
| Basic Composition | |
| Fertilizer 9-40-9 + 2CaO + 2 MgO | |
| Primary macro nutrients | |
| Potassium nitrate | 1.87 |
| Ammonium sulphate | 3.75 |
| Mono-ammonium phosphate | 49.46 |
| Mono-potassium phosphate | 19.67 |
| Potassium sulphate | 3.37 |
| Secondary macro nutrients | |
| Magnesium nitrate | 13.11 |
| Calcium nitrate | 7.65 |
| Micro nutrients | |
| Boric acid | 0.078 |
| Cobalt sulphate | 0.003 |
| Copper sulphate | 0.037 |
| Iron-EDTA | 0.77 |
| Manganese sulphate | 0.135 |
| Sodium molybdate | 0.02 |
| Zinc sulphate | 0.076 |
| Total | 400.00 |

Organic acids were added to the basic composition of Samples 3 and 4 in this Example 4 as tabulated in the following Table 7. As control samples, Sample 1 contained no acid and Sample 2 contained urea phosphate. The acids added and the weight fractions (wt. %) of these acids based on the total amount of the basic composition are listed in Table 7.

TABLE 7

| Sample Nos. | Acid added | Weight fraction (wt. %) | Precipitation | Turbidity (NTU) | pH |
|---|---|---|---|---|---|
| 1 | none | — | Yes | 168 | 3.9 |
| 2 | urea phosphate | 2.5 | Yes | 94 | 3.3 |
| 3 | malonic acid | 1.5 | Yes | 45 | 3.5 |
| 4 | malonic acid | 2 | No | 0 | 3.4 |

In preparation, the acids were mixed with the basic composition before dissolving the mixture in 1 liter of soft water of low alkalinity. A stock solution of 100 grams of this basic composition having the acid therein per liter of water was prepared.

The stability of the water solubility of the nutrients dissolved in the various stock solutions was assessed by observing whether precipitation occurred and by measuring the turbidity and pH of the solution. The results obtained are set forth in Table 7.

From the data in Table 7, it can be seen that a fertilizer composition which contains non-chelated trace elements, calcium, sulfates and a relatively high level of phosphates will result in precipitation in a stock solution of soft water of low alkalinity (see Sample 1). This can be avoided by the addition of an appropriate amount of an acid (see Samples 3 and 4). It can also be concluded from the results in Table 7 that urea phosphate (see Sample 2) is not as effective as for the samples containing malonic acid (Samples 3 and 4).

Although the invention has been described in its preferred forms with a certain degree of particularity, it is to be understood that the present disclosure has been made by way of example only. Numerous changes in the details of the compositions and in the operational steps of the methods and in the materials utilized therein will be apparent without deporting from the spirit and scope of the invention, as defined in the appended claims.

We claim:

1. A water soluble, solid fertilizer for producing a stable, essentially precipitate free fertilizer composition solution comprising:

at least one phosphorus free organic acid which is solid at ambient temperature and has a water solubility of at least 10 grams/liter (at 25° C.), the acid having an acidifying effect in the range of 0.5 to 1.3 g $HCO_3^-$/ grams acid, the acidifying effect being defined as the amount of $HCO_3^-$ that can be transformed into $H_2CO_3$ per gram of said acid, which amount is calculated employing the following formula:

$$61 \frac{n}{M_{w,acid}}$$

wherein $M_{w,acid}$ is the molecular weight of said acid and n represents the number of dissociation constants of the acid below a pKa value of 6.35, the acid being present in an amount sufficient to reduce the $HCO_3^-$ level in water by between about 60–400 parts per million when the composition is applied to water at a dosage of 1 gram per liter of water enabling formation of a stable, essentially precipitate free aqueous fertilizer solution, the amount of acid being measured by the formula:

$$Ac_{product} = \sum_{i=1}^{m} 61 \cdot \frac{n}{M_{w,acid\ i}} \cdot f_{acid\ i} \cdot 1000\ [\text{ppm}\ HCO_3^-]$$

wherein $Ac_{product}$ corresponds with the overall acidifying effect of a fertilizer product in parts per million $HCO_3^-$ at a dosage of 1 gram of water soluble fertilizer per liter of water; 61 is the molecular weight of bicarbonate or $HCO_3^-$ in grams/mole; n represents the number of dissociation constants of the acid below a pKa value of 6.35; $M_{w,acid\ i}$ is the molecular weight of the acid and is expressed in grams/ mole; $f_{acid\ i}$ is the (dimensionless) weight fraction of the acid in the fertilizer composition; m is the number of acids in a product and 1000 is the conversion factor for converting grams into milligrams or parts per million; and at least one fertilizer material selected from the group consisting of phosphorus, nitrogen and potassium containing primary macro nutrients; non-chelated secondary macro nutrients; non-chelated micro nutrients; and mixtures thereof; wherein the phosphorus containing primary macro nutrients are in the form of phosphates.

2. The fertilizer composition of claim 1 wherein the acidifying effect of the acid is about 0.9–1.3 g $HCO_3^-$/gram of acid.

3. The fertilizer composition of claim 1 wherein the acid is selected from the group consisting of malonic acid, malic acid, maleic acid, succinic acid, itaconic acid, glutaric acid, glycolic acid, tricarballyllic acid, adipic acid, pimelic acid, citric acid, maleic anhydride, succinic anhydride and mixtures thereof.

4. The fertilizer composition of claim 1 wherein the acid is present in the composition in an amount of about 2–90% by weight of the composition.

5. The fertilizer composition of claim 4 wherein the said acid is present in an amount of about 5–40% by weight of the composition.

6. The fertilizer composition of claim 1 wherein the phosphates are selected from the group consisting of mono-ammonium phosphate, di-ammonium phosphate, mono-potassium phosphate and tri-potassium phosphate.

7. The fertilizer composition of claim 1 wherein the nitrogen containing macro nutrients are selected from the group consisting of nitrates, ammonium salts and urea derivatives.

8. The fertilizer composition of claim 1 wherein the potassium containing macro nutrients are selected from the group consisting of potassium salts.

9. The fertilizer composition of claim 1 wherein the primary macro nutrients are present in the composition in an amount of about 1–99% by weight of the composition.

10. The fertilizer composition of claim 1 wherein the non-chelated secondary macro nutrients are selected from the group consisting of calcium salts, magnesium salts, sulfate salts and mixtures thereof.

11. The fertilizer composition of claim 1 wherein the secondary non-chelated macro nutrients are present in an amount of 0.1 to 99% by weight of the composition.

12. The fertilizer composition of claim 1 wherein the non-chelated micro nutrients are selected from the group consisting of iron sulfates and nitrates, manganese sulfates and nitrates, copper sulfates and nitrates, zinc sulfates and nitrates, cobalt sulfates and nitrates, boric acid, molybdates and mixtures thereof.

13. The fertilizer composition of claim 1 wherein the non-chelated micro nutrients are present in the composition in an amount of about 0.1–50% by weight of the composition.

14. The fertilizer composition of claim 1 comprising the organic acid in an amount of about 1–90% by weight of the composition and the fertilizer material in an amount of about 10–99% by weight of the composition.

15. The fertilizer composition of claim 1 comprising:
the organic acid in an amount of about 2–90% by weight of the composition;
mono-ammonium phosphate or mono-potassium phosphate in an amount of about 1–99% by weight of the composition;
calcium nitrate in an amount of about 0.1 to 99% by weight of the composition; and
other fertilizer materials in an amount of about 0 to 75% by weight of the composition.

16. The fertilizer composition of claim 1 comprising:
the organic acid in an amount of about 2–90% by weight of the composition;
mono-ammonium phosphate or mono-potassium phosphate in an amount of about 1–99% by weight of the composition;
calcium nitrate in an amount of about 1 to 99% by weight of the composition;
trace metal sulfates and nitrates in an amount of about 0.1 to 50% by weight of the composition; and
other fertilizer materials in an amount of about 0 to 75% by weight of the composition.

17. The fertilizer composition of claim 16 wherein the other fertilizer materials include magnesium nitrate.

18. The fertilizer composition of claim 1 comprising:
the organic acid in an amount of about 2–90% by weight of the composition;
mono-ammonium phosphate or mono-potassium phosphate in an amount of about 1–99% by weight of the composition;
trace metal sulfates and nitrates in an amount of about 0.1 to 50% by weight of the composition; and
other fertilizer materials in an amount of about 0 to 75% by weight of the composition.

19. The fertilizer composition of claim 18 wherein the other fertilizer materials include magnesium nitrate.

20. A stable, essentially precipitate free aqueous fertilizer solution formed by dissolving a water soluble, solid fertilizer composition in water, the fertilizer composition comprising:
at least one phosphorus free organic acid which is solid at ambient temperature and has a water solubility of at least 10 g/l (at 25° C.) and an acidifying effect in the range of 0.5 to 1.3 g $HCO_3^-$/grams acid, the acidifying effect of the acid being defined as the amount of $HCO_3^-$ that can be transformed into $H_2CO_3$ per gram of said acid, which amount is calculated employing the following formula:

$$61 \frac{n}{M_{w,acid}}$$

wherein $M_{w,acid}$ is the molecular weight of said acid and n represents the number of dissociation constants of the acid below a pKa value of 6.35;

the acid being present in an amount sufficient to reduce the $HCO_3^-$ level in the water by between about 60–400 parts per million when the composition is applied to the water at a dosage of 1 gram per liter of water enabling formation of a stable, essentially precipitate free aqueous fertilizer solution, the amount of acid being measured by the formula:

$$Ac_{product} = \sum_{i=1}^{m} 61 \cdot \frac{n}{M_{w,acid\ i}} \cdot f_{acid\ i} \cdot 1000 \,[\text{ppm } HCO_3^-]$$

wherein $Ac_{product}$ corresponds with the overall acidifying effect of a fertilizer product in parts per million $HCO_3^-$ at a dosage of 1 gram of water soluble fertilizer per liter of water; 61 is the molecular weight of bicarbonate or $HCO_3^-$ in grams/mole; n represents the number of dissociation constants of the acid below a pKa value of 6.35; $M_{w,acid\ i}$ is the molecular weight of the acid and is expressed in grams/mole; $f_{acid\ i}$ is the (dimensionless) weight fraction of the acid in the fertilizer composition; m is the number of acids in a product and 1000 is the conversion factor for converting grams into milligrams or parts per million; and at least one fertilizer material selected from the group consisting of phosphorus, nitrogen and potassium containing primary macro nutrients; non-chelated secondary macro nutrients; non-chelated micro nutrients; and mixtures thereof; wherein the phosphorus containing primary macro nutrients are in the form of phosphates.

21. The aqueous fertilizer solution of claim 20 wherein the acid is selected from the group consisting of malonic acid, malic acid, maleic acid, succinic acid, itaconic acid, glutaric acid, glycolic acid, tricarballyllic acid, adipic acid, pimelic acid, citric acid, maleic anhydride, succinic anhydride and mixtures thereof.

22. The aqueous fertilizer solution of claim 20 wherein the phosphates are selected from the group consisting of mono-ammonium phosphate, di-ammonium phosphate, mono-potassium phosphate and tri-potassium phosphate.

23. The aqueous fertilizer solution of claim 20 wherein the nitrogen containing macro nutrients are selected from the group consisting of nitrates, ammonium salts and urea derivatives.

24. The aqueous fertilizer solution of claim 20 wherein the potassium containing macro nutrients are selected from the group consisting of potassium salts.

25. The aqueous fertilizer solution of claim 20 wherein the primary macro nutrients are present in the composition in an amount of about 1–99% by weight of the composition.

26. The aqueous fertilizer solution of claim 20 wherein the non-chelated secondary macro nutrients are selected from the group consisting of calcium salts, magnesium salts, sulfate salts and mixtures thereof.

27. The aqueous fertilizer solution of claim 20 wherein the non-chelated secondary macro nutrients are present in an amount of 0.1 to 99% by weight of the composition.

28. The aqueous fertilizer solution of claim 20 wherein the non-chelated micro nutrients are selected from the group consisting of iron sulfates and nitrates, manganese sulfates and nitrates, copper sulfates and nitrates, zinc sulfates and nitrates, cobalt sulfates and nitrates, boric acid, molybdates and mixtures thereof.

29. The aqueous fertilizer solution of claim 20 wherein the non-chelated micro nutrients are present in the composition in an amount of about 0.1–50% by weight of the composition.

30. The aqueous fertilizer solution of claim 20 wherein the fertilizer composition comprises about 5–40% by weight of the solution.

31. The aqueous fertilizer solution of claim 20 wherein the fertilizer composition comprises about 0.05–1% by weight of the solution.

* * * * *

UNITED STATES PATENT AND TRADEMARK OFFICE
CERTIFICATE OF CORRECTION

PATENT NO. : 6,312,493 B1
DATED : November 6, 2001
INVENTOR(S) : Michael Gustaaf Eltink et al.

It is certified that error appears in the above-identified patent and that said Letters Patent is hereby corrected as shown below:

Column 1,
Line 62, change "phophites" to -- phosphites --.

Column 2,
Line 39, delete "of".

Column 3,
Line 10, after "acidifying", delete the comma ",".

Column 4,
Line 23, change "6.35," to -- 6.35. --.
Line 36, change "acidity" to -- acidifying --.
Line 37, change "are" to -- is --.
Line 40, change the formula to read as folllows:

-- $$Ac_{product} = \sum_{i=1}^{m} 61 \cdot \frac{n}{M_{w,acid\ i}} \cdot f_{acid\ i} \cdot 1000\ [ppm HCO_3^-]$$ --

Line 48, change "HCO$_3$-" to -- $HCO_3^-$ --.
Line 50, after "HCO$_3^-$" insert -- in grams/mole; --.
Line 54, change "M$_{w,acid}$" to -- $M_{w,acid\ i}$ --.
Line 55, delete "of fertilizer composition".
Line 56, change "f" to -- $f_{acid\ i}$ --.
Line 58, delete "acid".

Column 5,
Line 41, change "HCO$_{30}^-$" to -- $HCO_3^-$ --.
Line 41, change "preferably" to -- more preferably between --.

Column 6,
Line 7, change "2hydroxy" to -- 2-hydroxy --.

Column 7,
Line 18, change "malonic" to -- citric --.
Line 23, change "that" to -- the --.
Line 24, change "6.35.)" to -- 6.35. --.
Line 35, change "measured" to -- defined --.
Line 38, change the formula to read as follows:

-- $$Ac_{product} = \sum_{i=1}^{m} 61 \cdot \frac{n}{M_{w,acid\ i}} \cdot f_{acid\ i} \cdot 1000\ [ppm HCO_3^-]$$ --

UNITED STATES PATENT AND TRADEMARK OFFICE
CERTIFICATE OF CORRECTION

PATENT NO. : 6,312,493 B1
DATED : November 6, 2001
INVENTOR(S) : Michael Gustaaf Eltink et al.

It is certified that error appears in the above-identified patent and that said Letters Patent is hereby corrected as shown below:

Column 7 (cont'd),
Line 46, after "$HCO_3^-$" insert -- in grams/mole; --.
Line 51, change "$M_{w,acid}$" to -- $M_{w,acid\ i}$ --.
Line 52, delete "of fertilizer composition".
Line 53, change "f" to -- $f_{acid\ i}$ --.
Line 55, delete "acid".

Column 8,
Lines 7 and 8, move "Composition 1. Fertilizer 10-14-27" to the title bar on the same line as "w/w %".
Line 38, change "f" to -- $f_{maleic\ acid}$ --.

Column 9,
Line 20, change "5%" to -- 95% --.

Column 10,
Line 30, change "Ca-EDTA" to -- calcium-EDTA --.
Line 30, change "Mg-EDTA" to -- magnesium-EDTA --.

Columns 11 and 12,
Table 2, change the heading "$CaNO_3$ (g/l)" to -- $Ca(NO_3)_2$ (g/l) --.
Table 2, change the heading "$MgNO_3$ (g/l)" to -- $Mg(NO_3)_2$ (g/l) --.

Columns 13 and 14,
Table 3, change the heading "$CaNO_3$ (g/l)" to -- $Ca(NO_3)_2$ (g/l) --.
Table 3, change the heading "$MgNO_3$ (g/l)" to -- $Mg(NO_3)_2$ (g/l) --.

Columns 15 and 16,
Table 5, Sample No. 11, in the pH Feed column, change "49" to -- 4.9 --.

Column 15,
Line 26, change "17-21" to -- 18-21 --.

Column 17,
Table 6, change "Total 400.00" to -- Total 100.00 --.

UNITED STATES PATENT AND TRADEMARK OFFICE
CERTIFICATE OF CORRECTION

PATENT NO. : 6,312,493 B1
DATED : November 6, 2001
INVENTOR(S) : Michael Gustaaf Eltink et al.

It is certified that error appears in the above-identified patent and that said Letters Patent is hereby corrected as shown below:

Column 18,
Line 10, after "fertilizer" insert -- composition --.
Line 11, delete "composition".

Signed and Sealed this

Tenth Day of August, 2004

JON W. DUDAS
*Acting Director of the United States Patent and Trademark Office*